UNITED STATES PATENT OFFICE 2,223,398

EXTRACTION OF STEROLS

William Gordon Bennett, Epsom, England, assignor to Standard Brands Incorporated, New York, N. Y.

No Drawing. Application November 16, 1938, Serial No. 240,729. In Great Britain November 23, 1937

11 Claims. (Cl. 260—397)

This invention relates to a method for the extraction of sterols. More particularly, it is concerned with the extraction of ergosterol from substances or organisms containing it, and includes correlated improvements and discoveries whereby the production of ergosterol is enhanced.

It is an object of the invention to provide a method in accordance with which sterols may be extracted with a high yield and having marked purity.

Another object of the invention is the provision of a method whereby sterols may be separated through the utilization of an organic solvent which is only partially but not completely miscible with water.

A further object of the invention is to provide a method for separating sterols which may be effectively, readily and economically carried out commercially.

A still further object of the invention is the provision of a method whereby sterols may be separated with facility from yeasts, molds, and other similar fungoid organisms.

A particular object of the invention is to provide a method in which sterols are extracted from organisms containing them through the utilization of an aliphatic alcohol containing from four to six carbon atoms.

A specific object of the invention is a method for the extraction of ergosterol from yeast by means of butanol, i. e., normal butyl alcohol, in accordance with which the ergosterol is obtained in a condition of distinctive purity.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

Ergosterol is associated with the fat contained in yeast or other ergosterol-containing organism, and according to the present invention a fraction containing the fat or lipoidal substance separated in a suitable way, as by plasmolysis, or by boiling with acid, is treated with an organic solvent which is only partially, i. e., not completely, miscible in water and stable to the action of caustic alkalis, particularly an aliphatic alcohol containing from four to six carbon atoms. The solution of the fat in the extracting solvent may be concentrated (e. g. by driving off, preferably under reduced pressure, a binary mixture of solvent and water) and is then treated to saponify the fat in the presence of the solvent. Thereby the sterol and also the soap resulting from the saponification are contained in said solvent which is then subjected to evaporation almost to dryness. Water, preferably hot, is now added to dissolve the solvent, whereupon the sterol crystallizes out leaving the soap in solution in the solvent.

As an illustrative embodiment of a manner in which the invention may be practiced, the following example is presented. The parts are by weight.

100 parts of yeast are boiled with twice the amount of N/2 sulfuric acid for two hours, and after the addition of 10% of a filter-aid, e. g. "Filtercel," are diluted to 1000 parts with cold water. The solid residue is filtered off and washed with water. This residue is then introduced into 250 parts of butanol (normal butyl alcohol) and the mixture distilled under reduced pressure until a binary mixture of water and the alcohol is completely removed. After standing for one hour at 100° C. the hot butanol extract, which now contains the sterol fraction of the yeast, is filtered from the residue, and the latter washed with a further small quantity of dry butanol. Filtrate and washings are concentrated to 40 parts and boiled for one hour with an equal volume of 8% aqueous caustic soda. After cooling to 40° C. the butanol layer is separated and distilled under reduced pressure until the rate of distillation suddenly slackens and a solid residue of soap and sterol wet with a little butanol remains. This is treated with just enough hot water to dissolve the remaining butanol and cooled, preferably to 3° C. for two hours. The sterol fraction precipitates and may be filtered off readily and washed with a little ice-water. It is then dried in air. The product is a white solid containing practically nothing but sterols and usually contains about 80% ergosterol.

A preferred solvent is butyl alcohol. It accelerates the process of saponification and meanwhile prevents or minimizes bumping and frothing. Further, if a suitable concentration of an alkali, for example, caustic soda, caustic potash and other strong alkali, is employed, a substantially complete separation of the alkali and the solution of soap and sterol in the butyl alcohol can be obtained. Moreover, the high solubility of the yeast fat soap in aqueous butyl alcohol renders the separation of the soap from the sterol very easy.

In addition to butanol or normal butyl alcohol, other butyl alcohols may be used, as may also the amyl and the hexyl alcohols, i. e., other alcohols containing four, five and six carbon atoms.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A method for the extraction of sterols, which comprises separating lipoidal substance from a fungoid organism, treating lipoidal substance with an aliphatic alcohol having from four to six carbon atoms as a solvent, removing a binary mixture of solvent and water, saponifying lipoidal substance in the presence of solvent, evaporating, then adding water to dissolve solvent with subsequent precipitation of sterols, and finally separating precipitated sterols.

2. A method for the extraction of sterols, which comprises separating lipoidal substance from a fungoid organism, treating lipoidal substance with butanol as a solvent, removing a binary mixture of solvent and water, saponifying lipoidal substance in the presence of solvent, evaporating, then adding water to dissolve solvent with subsequent precipitation of sterols, and finally separating precipitated sterols.

3. A method for the extraction of sterols, which comprises separating lipoidal substance from a fungoid organism, treating lipoidal substance with butanol as a solvent, removing a binary mixture of solvent and water, saponifying lipoidal substance with a strong alkali in the presence of a solvent, evaporating until a solid mass is obtained, adding hot water to dissolve solvent, cooling whereupon sterols precipitate, separating precipitated sterols by filtering, and then washing and drying.

4. A method for the extraction of sterols, which comprises separating lipoidal substance from a yeast, treating lipoidal substance with an aliphatic alcohol having from four to six carbon atoms as a solvent, removing a binary mixture of solvent and water, saponifying lipoidal substance in the presence of solvent, evaporating, then adding water to dissolve solvent with subsequent precipitation of sterols, and finally separating precipitated sterols.

5. A method for the extraction of sterols, which comprises separating lipoidal substance from a yeast, treating lipoidal substance with butanol as a solvent, removing a binary mixture of solvent and water, saponifying lipoidal substance with a strong alkali in the presence of a solvent, evaporating until a solid mass is obtained, adding hot water to dissolve solvent, cooling whereupon sterols precipitate, separating precipitated sterols by filtering, and then washing and drying.

6. A method for the extraction of sterols, which comprises separating lipoidal substance from a yeast, treating said lipoidal substance with butanol, removing a binary mixture of butanol and water, saponifying lipoidal substance with sodium hydroxide in the presence of butanol, evaporating until a solid mass is obtained, adding hot water to said mass to dissolve solvent therefrom, cooling whereupon sterols are precipitated, and then separating precipitated sterols by filtering, washing the precipitate with ice water, and drying in air.

7. A method for the extraction of sterols, which comprises treating yeast with a dilute sulfuric acid, separating solid from liquid, introducing the solid so obtained into butanol, distilling the mixture so produced under reduced pressure until a binary mixture of water and butanol is removed, again separating solid from liquid and washing the separated solid with butanol, concentrating the liquid, saponifying under the influence of heat with aqueous caustic soda, cooling whereupon a butanol layer separates, subjecting said layer to distillation under reduced pressure until a solid mass is obtained, dissolving this solid mass in hot water, cooling to a temperature of about 3° C. whereupon sterols precipitate, and then separating precipitated sterols by filtering, washing with ice water, and drying in air.

8. A method for the extraction of sterols from fungoid organisms, which includes as a step the treatment of lipoidal substance separated from a fungoid organism with an aliphatic alcohol having four to six carbon atoms, followed by saponification of lipoidal substance, evaporation, and precipitation and separation of sterols.

9. A method for the extraction of sterols from fungoid organisms, which includes as a step the treatment of lipoidal substance separated from a fungoid organism with butanol, followed by saponification of lipoidal substance, evaporation, and precipitation and separation of sterols.

10. A method for the extraction of sterols from yeast, which includes the step of treating lipoidal substance separated from a yeast with an aliphatic alcohol having from four to six carbon atoms, followed by saponification of lipoidal substance, evaporation, and precipitation and separation of sterols.

11. A method for the extraction of sterols from yeast, which includes the step of treating lipoidal substance separated from a yeast with butanol, followed by saponification of lipoidal substance, evaporation, and precipitation and separation of sterols.

WILLIAM GORDON BENNETT.